Patented May 18, 1948

2,441,558

UNITED STATES PATENT OFFICE 2,441,558

PROCESS FOR PREPARING N-ARYLTHIAZO-LINIUM QUATERNARY SALTS

Leslie G. S. Brooker, Rochester, N. Y., assignor to Eastman Kodak Company, Rochester, N. Y., a corporation of New Jersey No Drawing. Application October 16, 1945, Serial No. 622,677

5 Claims. (Cl. 260—304)

This invention relates to N-arylthiazolinium quaternary salts, to a process for preparing them and to dyes made therefrom.

N-phenylbenzothiazolium quaternary salts containing a methyl group in the α-position have been prepared by oxidizing thioacetyldiphenyl-amines with iodine. See United States Patent 2,317,357, dated April 27, 1943. Such N-phenyl compounds have also been prepared by hydrolyzing 2-carbalkoxymethylene-3-phenylbenzothi-azolines. See United States Patent 2,330,203, dated September 28, 1943.

I have now found a method for preparing N-arylthiazolinium quaternary salts containing a methyl group in the α-position. It is, accordingly, an object of my invention to provide N-arylthiazolinium quaternary salts and to provide a process for preparing them. A further object is to provide new dyes and a process for preparing them, as well as to provide photographic emulsions sensitized with these dyes.

In accordance with my invention, I prepare N-arylthiazolinium quaternary salts of the following general formula:

I.

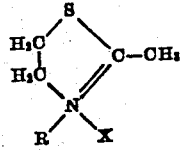

wherein R represents an aryl group, e. g. phenyl, naphthyl, etc., and X represents an anion, e. g. bromide, iodide, chloride, perchlorate, etc., by condensing ethylene dibromide with a N-thio-acetylarylamine of the following general formula:

II.

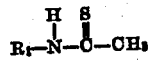

wherein $R_1$ represents an aryl group such as those recited above under Formula I.

Typical of the N-thioacetylarylamines of Formula II are: N-thioacetylaniline, N-thioacetyl-α-naphthylamine, N-thioacetyl-p-chloroaniline, N-thioacetyl-p-methoxyaniline, N-thioacetyl-m-toluidine, N-thioacetyl-o-toluidine, N-thioacetyl-p-toluidine, N-thioacetyl-β-naphthylamine, N-thioacetyl-p-cyanoaniline, N-thioacetyl-p-dimethylaminoaniline, etc.

The following examples will serve to illustrate further the manner of obtaining N-arylthiazolinium quaternary salts.

Example 1.—2-methyl-3-phenylthiazolinium perchlorate

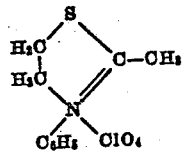

15.1 g. (1 mol.) of thioacetanilide and 18.7 g. (1 mol.) of ethylene dibromide were fused together by heating in an oil bath at 115 to 120° C. After 5 minutes' heating at this temperature, a vigorous reaction took place liberating much hydrogen bromide. When the fused mass has been heated for 45 minutes, 8.2 g. (1 mol.) of sodium acetate were added and the resulting mixture was heated for an additional 15 hours at 115 to 120° C. The cooled reaction mixture (containing 2-methyl-3-phenylthiazolinium bromide) was then dissolved in 450 cc. of warm water (about 70° C.) and an aqueous solution of 18 g. (1 mol.) of sodium perchlorate was added. The resulting solution was chilled, and the solid product filtered off. It was washed on the filter with 5 cc. of water and dried. The dried product (2 methyl-3-phenylthiazolinium perchlorate) weighed 8.9 g. (32 per cent yield) and was a brownish colored compound, melting at 155 to 158° C.

Example 2.—2-methyl-3-(α-naphthyl)thiazolinium perchlorate

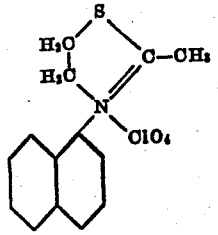

20.1 g. (1 mol.) of thioacetyl-α-naphthylamine and 18.8 g. of ethylene dibromide were fused together by heating in an oil bath at 115° C. After being heated 3 to 5 minutes, the reaction started and soon became quite vigorous with evolution of much hydrogen bromide. The mixture was heated a total of 16 hours in an oil bath at 115° C. The reaction mixture containing 2-methyl-3-(α-naphthyl)-thiazolinium bromide, was allowed to cool, and then was extracted with two 50 cc. portions of boiling water. To the hot extract were added 14.1 g. (1 mol.) of sodium perchlorate. The resulting solution was chilled and the 2- methyl-3-(α-naphthyl)thiazolinium perchlorate which precipitated was filtered off. The moist product was recrystallized from 150 cc. of methyl alcohol and obtained as pale-yellow leaflets, melting at 172 to 173° C. Yield 19.3 g. (59%).

In a similar manner other 2-methyl-3-arylthiazolinium quaternary salts can be prepared, e. g. 2-methyl-(β-naphthyl) thiazolinium bromide and perchlorate, 2-methyl-(p-chlorophenyl) thiazolinium perchlorate, etc. In the foregoing examples, the thiazolinium iodides can be obtained by using potassium iodide instead of sodium perchlorate. The thiazolinium chlorides can be prepared from the thiazolinium iodides according to the process described in United States Patent 2,245,249, or 2,245,250, each dated June 10, 1941.

I have found that the N-arylthiazolinium quaternary salts of my invention can be condensed with diarylformamidines to give β-arylaminovinyl derivatives of the following general formula:

III.

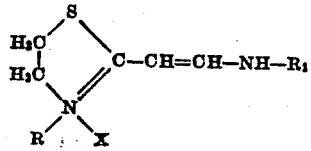

wherein R and X have the values given above, and R₁ represents an aryl group, e. g. phenyl, naphthyl, etc. The condensations are advantageously effected by fusing the N-arylthiazolinium quaternary salt with the diarylformamidine. The following examples will illustrate further the manner of obtaining the β-arylaminovinyl derivatives.

*Example 3.—2-(2-anilinovinyl)-3-phenylthiazolinium perchlorate*

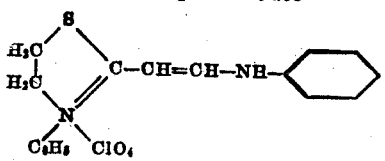

2.8 g. (1 mol.) of 2-methyl-3-phenylthiazolinium perchlorate and 2.4 g. (1 mol. + 20% excess) of diphenylformamidine were intimately mixed and fused in an oil bath at 155° C. for 10 minutes. The fused mass was allowed to cool to approximately 80° C., and then treated with 15 cc. of absolute ethyl alcohol, stirring until the product became crystalline. The mixture was then chilled, the β-arylaminovinyl compound collected on a filter, washed first with absolute ethyl alcohol, then with diethyl ether and dried. Yield 1.3 g. (34%).

*Example 4.—2-(2-anilinovinyl)-3-(α-naphthyl)thiazolinium perchlorate*

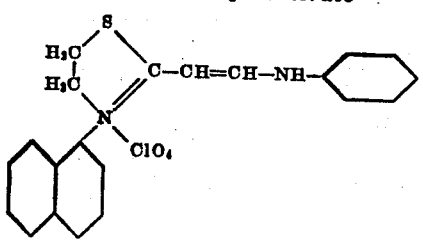

6.6 g. (1 mol.) of 2-methyl-3-(α-naphthyl) thiazolinium perchlorate and 3.9 g. (1 mol.) of diphenylformamidine were fused together by heating in an oil bath for 10 minutes at 150° C. The melt was cooled to approximately 80° C. and 40 cc. of absolute ethyl alcohol were added. The resulting mixture was stirred until crystalline. The cooled mixture was filtered, and the β-arylaminovinyl compound thus collected was washed well with absolute ethyl alcohol and dried. There was obtained 7.5 g. (87%) yield of the β-arylaminovinyl compound as a buff colored powder, melting at 246-247° C.

In a similar manner other 2-(2-arylaminovinyl)-3-arylthiazolinium quaternary salts can be prepared.

The 2-methyl-3-arylthiazolinium quaternary salts of Formula I can be condensed with alkyl orthoformates (e. g. methyl orthoformate, ethyl orthoformate, propyl orthoformate, etc.) to give symmetrical carbocyanine dyes of the following general formula:

IV.

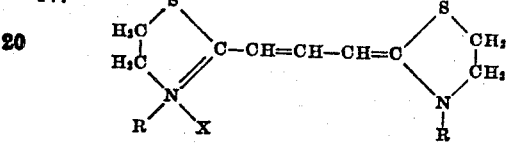

wherein R and X have the values given above. The condensations are advantageously effected in the presence of an acid-binding agent, e. g. in pyridine or in an alcoholic (methyl, ethyl, propyl, butyl, etc.) solution of a tertiary amine, e. g. triethylamine, N-methylpiperidine, triamylamine, etc. The following examples will serve to illustrate further the manner of obtaining such dyes.

*Example 5.—3,3'-diphenylthiazolinocarbocyanine perchlorate*

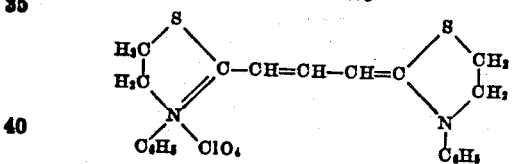

2.8 g. (2 mols.) of 2-methyl-3-phenylthiazolinium perchlorate, 2.2 g. (1 mol. + 200% excess) of ethyl orthoformate and 20 cc. of pyridine were refluxed together for 3 hours, chilled, and the above dye precipitated by adding diethyl ether to the chilled mixture. Yield of crude dye 1.3 g. (46%). The crude dye was first triturated with 50 cc. of hot absolute ethyl alcohol, then after three recrystallizations from methyl alcohol (50 cc. per g. of dye), the dye was obtained as brown crystals, melting at 211 to 212° C. with decomposition. The dye sensitized a photographic gelatino-silver-chlorobromide emulsion to about 525 mu with a maximum at about 495 mu.

*Example 6. — 3,3'-di-(α-naphthyl)thiazolinocarbocyanine perchlorate*

1.64 g. (2 mols.) of 2-methyl-3-(α-naphthyl)-thiazolinium perchlorate, 0.7 g. (1 mol. + 100% excess) of ethyl orthoformate and 10 cc. of dry pyridine were refluxed together for 8 minutes. The dye began to separate from the hot reaction mixture. This mixture was cooled, filtered, product washed with 3 to 10 cc. portions of methyl alcohol and dried. Yield of crude dye 1.0 g. (35%). The purification of the dye was accomplished by first dissolving it in 10 cc. of boiling pyridine, filtering the hot pyridine solution, and adding hot water to this solution to turbidity. After two treatments as described, the dye was obtained as buff needles melting at 300 to 301° C. with decomposition. Yield 0.6 g. (21%). This dye sensitized a photographic gelatinosilver-chlorobromide emulsion to about 525 mu with maximum sensitivity at about 495 mu.

In a similar manner other 3,3'-diarylthiazolinocarbocyanine dyes can be prepared.

The quaternary salts of Formula I can also be condensed with p-dialkylaminobenzaldehydes to give N-arylthiazolinium quaternary salts containing a β-(p-dialkylaminophenyl)vinyl group in the 2-position. Such quaternary salts are dyes of the styryl type and can be represented by the following general formula:

V.

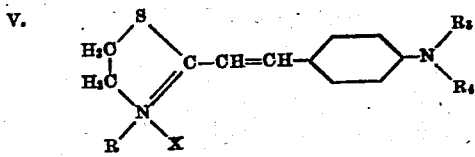

wherein R and X have the values given above and R₃ and R₄ each represents an alkyl group. The condensations are advantageously effected in the presence of a catalyst facilitating the splitting out of water, e. g. piperidine, diethylamine, etc. The following example will serve to illustrate further the preparation of these styryl type dyes.

*Example 7.—2-(p-dimethylaminostyryl)-3-phenylthiazolinium perchlorate*

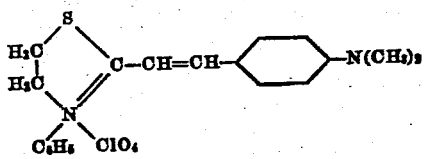

138 g. (1 mol.) of 2-methyl-3-phenylthiazolinium perchlorate, 0.9 g. (1 mol.) of p-dimethylaminobenzaldehyde, 15 cc. of absolute ethyl alcohol and 2 drops of piperidine were refluxed together for 4 hours. The reaction mixture was chilled, filtered, product washed with absolute ethyl alcohol and dried. Yield of crude dye 1.3 g. (64%). After four recrystallizations from methyl alcohol (75 cc. per g. of dye), the dye was obtained as dark crystals with greenish lustre melting at 208 to 209° C. with decomposition. Yield 0.1 g. (5%). The dye sensitized a photographic gelatino-silver-bromoiodide emulsion to about 570 mu without any well-defined maximum.

In a similar manner 2-(p-dimethylaminostyryl)-3-(α-naphthyl)thiazolinium perchlorate and 2-(p-diethylaminostyryl)-3-phenylthiazolinium perchlorate, etc. can be prepared.

The quaternary salts containing a β-arylaminovinyl group (Formula III) can be condensed with heterocyclic organic compounds containing a —CO—CH₂—Q— group in the heterocyclic ring, the Q representing an oxygen atom, a sulfur atom, a carbonyl group or a

group wherein R represents a member selected from the group consisting of a hydrogen atom, an alcohol radical (i. e. an alkyl group, e. g. methyl, ethyl, propyl, etc.) and an aryl group, e. g. phenyl, to give merocarbocyanine dyes. The condensations are advantageously effected in the presence of an acid-binding agent, e. g. a trialkylamine, piperidine, N-methylpiperidine, dimethylaniline, etc. The following examples will serve to illustrate further the manner of obtaining such merocarbocyanine dyes which are represented by the following general formula:

VII.

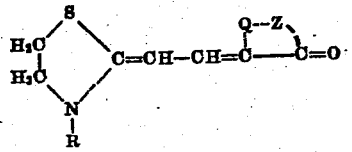

wherein R and Q have the value given above and Z represents the non-metallic atoms necessary to complete a heterocyclic nucleus containing from 5 to 6 atoms in the heterocyclic ring, e. g. a rhodanine nucleus (for instance rhodanine, 3-ethylrhodanine, 3-(β-hydroxyethyl)rhodanine, 3-(β-carboxyethylrhodanine), 3-(β-sulfoethyl)-rhodanine, 3-phenylrhodanine, 3-(p-carboxyphenyl)-rhodanine, 3-carboxymethylrhodanine, etc.), a 2-thio-2,4(3,5)-oxazoledione nucleus (for instance 3-carboxymethyl-2-thio-2,4(3,5)-oxazoledione, 3-(β-sulfoethyl)-2-thio-2,4(3,5)-oxazoledione, 3-ethyl-2-thio-2,4(3,5)-oxazoledione, etc.), a 2-thiohydantoin nucleus (for instance 2-thiohydantoin, 1,3-diphenyl-2-thiohydantoin, 3-ethyl-1-phenyl-2-thiohydantoin, etc.), a 5-pyrazolone nucleus (for instance 3-methyl-1-phenyl-5-pyrazolone, 3-methyl-1-(p-sulfophenyl)-5-pyrazolone, 3-methyl-1-(p-carboxyphenyl)-5-pyrazolone, 3-methyl-1-(α-benzothiazolyl)-5-pyrazolone, etc.), a barbituric acid nucleus, a thiobarbituric acid nucleus, etc.

*Example 8.—3-ethyl-5-[(3-phenyl-2(3)-thiazolinylidene)ethylidene]-2-thio-2,4(3,5)-oxazoledione*

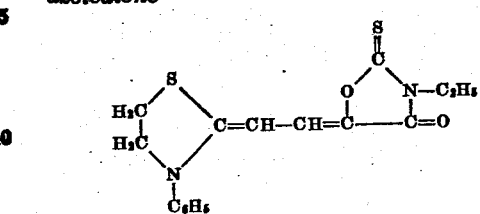

1.3 g. (1 mol.) of 2-(2-anilinovinyl)-3-phenylthiazolinium perchlorate, 0.5 g. (1 mol.) of 3-ethyl-2-thio-2,4(3,5)-oxazoledione, 15 cc. of absolute ethyl alcohol, and 0.34 g. (1 mol.) of triethylamine were refluxed together for 15 minutes, the reaction mixture chilled, filtered and dried. Yield of crude dye 0.4 g. (36%). After two recrystallizations from a mixture of acetone and methyl alcohol (85% MeOH and 15% acetone), the dye was obtained as large, yellowish-orange crystals melting at 198 to 199° C. Yield 0.25 g. (23%). The dye sensitized a photographic gelatino-silver-chlorobromide emulsion to about 545 mu with maximum sensitivity at about 515 mu.

*Example 9.—3-ethyl-5-[(3-α-naphthyl-2(3)-thiazolinylidene)ethylidene]-2-thio-2,4(3,5)-oxazoledione*

2.15 g. (1 mol.) of 2-(2-anilinovinyl)-3-(α-naphthyl)-thiazolinium perchlorate, 0.73 g. (1 mol.) of 3-ethyl-2-thio-2,4(3,5)-oxazoledione, 15 cc. of absolute ethyl alcohol and 0.5 g. (1 mol.) of triethylamine were refluxed together for 30 minutes, reaction mixture chilled, filtered and dried. Yield of crude dye 1.9 g. (100%). After two recrystallizations from methyl alcohol, (125 cc per g. of dye), the dye was obtained as amber colored crystals melting at 235 to 236° C. Yield 0.8 g. (42%). The dye sensitized a photographic gelatino-silver-chlorobromide emulsion to about 530 mu with maximum sensitivity at about 510 mu.

Sensitization by means of the herein-described dyes is, of course, primarily directed to the ordinarily employed gelatino-silver-halide developing-out emulsions. The dyes are advantageously incorporated in the washed, finished emulsions and should, of course, be uniformly distributed throughout the emulsions.

The concentration of these dyes in the emulsion can vary widely, i. e., from about 5 to about 100 mg. per liter of flowable emulsions. The concentration of the dye will vary according to the type of light-sensitive material in the emulsion and according to the effect desired. The suitable and most economical concentration for any given emulsion will be apparent to those skilled in the art upon making the ordinary tests and observations customarily used in the art of emulsion making.

To prepare a gelatino-silver-halide emulsion sensitized with one of these dyes, the following procedure is satisfactory. A quantity of the dye is dissolved in methyl alcohol or other suitable solvent, and a volume of this solution (which may be diluted with water) containing from 5 to 100 mg. of dye is slowly added to about 1,000 cc. of gelatino-silver-halide emulsion with stirring. Stirring is continued until the dye is uniformly distributed throughout the emulsion. With most of my new sensitizing dyes, 10 to 20 mg. of dye per liter of emulsion suffices to produce the maximum sensitizing effect with the ordinary gelatino-silver-bromiodide emulsions.

The above statements are only illustrative and are not to be understood as limiting my invention, as it will be apparent that these dyes can be incorporated by other methods in any of the photographic silver-halide emulsions customarily employed in the art. For instance, the dyes may be incorporated by bathing a plate or film upon which an emulsion has been coated in a solution of the dye in an appropriate solvent. Bathing methods, however, are not to be preferred ordinarily.

What I claim as my invention and desire to be secured by Letters Patent of the United States is:

1. A process for preparing a N-arylthiazolinium quaternary salt comprising condensing ethylene dibromide with a N-thioacetylarylamine selected from those represented by the following general formula:

wherein $R_1$ represents an aryl group selected from those consisting of aryl groups of the benzene series and aryl groups of the naphthalene series.

2. A process for preparing a N-arylthiazolinium quaternary salt comprising condensing ethylene dibromide with a N-thioacetylarylamine selected from those represented by the following general formula:

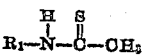

wherein $R_1$ represents an aryl group of the benzene series.

3. A process for preparing a N-arylthiazolinium quaternary salt comprising condensing ethylene dibromide with a N-thioacetylarylamine selected from those represented by the following general formula:

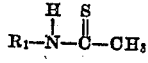

wherein $R_1$ represents an aryl group of the naphthalene series.

4. A process for preparing a N-arylthiazolinium quaternary salt comprising condensing ethylene dibromide with thioacetanilide.

5. A process for preparing a N-arylthiazolinium quaternary salt comprising condensing ethylene dibromide with thioacetyl α-naphthylamine.

LESLIE G. S. BROOKER.

REFERENCES CITED

The following references are of record in the file of this patent:

UNITED STATES PATENTS

| Number | Name | Date |
|---|---|---|
| 2,342,546 | Kendall | Feb. 22, 1944 |
| 2,369,509 | White | Feb. 13, 1945 |